(12) United States Patent
Kurokawa et al.

(10) Patent No.: US 6,489,266 B1
(45) Date of Patent: *Dec. 3, 2002

(54) IMAGE-RECEIVING SHEET

(75) Inventors: Shinichi Kurokawa, Tokyo-to (JP); Katsuyuki Oshima, Tokyo-to (JP)

(73) Assignee: Dai Nippon Printing Co., Ltd., Tokyo-to (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,168
(22) Filed: Jul. 28, 1998

(30) Foreign Application Priority Data

Jul. 29, 1997 (JP) .............................. 9-218036

(51) Int. Cl.[7] .......................... B41M 5/035; B41M 5/38
(52) U.S. Cl. ...................... 503/227; 428/195
(58) Field of Search .............................. 8/471; 428/195, 428/913, 914; 503/227

(56) References Cited

FOREIGN PATENT DOCUMENTS

| JP | 02-203375 | * | 8/1990 |
| JP | 02-212193 | * | 8/1990 |
| JP | 08-310170 | * | 11/1996 |

* cited by examiner

Primary Examiner—Bruce H. Hess
(74) Attorney, Agent, or Firm—Ladas & Parry

(57) ABSTRACT

There is provided an image receiving sheet which comprises: a substrate sheet, a reflection layer disposed on at least one surface side of the substrate sheet so as to be laid on at least one area thereof, and a receptor layer disposed on at least one surface side of the substrate sheet, wherein the reflection layer has at least one area provided with a convexo-concave pattern, the area provided with the convexo-concave pattern of the reflection layer being extended within an area provided with the receptor layer. The reflection layer is disposed, as required, either on the same surface side of the substrate sheet as the receptor layer is disposed so as to be interposed between the substrate sheet and the receptor layer or on the opposite side of a transparent substrate sheet to the surface provided with the receptor layer. The convexo-concave pattern may comprise an interference fringe, and may be divided into plural areas. The divided convexo-concave pattern may be composed of a single or plural kinds of pattern. The receptor layer is disposed on only one surface side of the substrate sheet, and the adhesive layer and the release sheet are disposed in this order on the other surface side, as required.

21 Claims, 2 Drawing Sheets

IMAGE-RECEIVING SHEET

BACKGROUND OF THE INVENTION

The present invention relates to an image-receiving sheet. More specifically, the present invention relates to an image-receiving sheet which can form a high-quality image and which provides optical information by reflected light.

Heretofore, a printer based on such method as a sublimation type thermal transfer method, a heat fusion type transfer method, or an ink-jet method is used for the output print of a computer or a word processor. In addition, because of the recent progress of an image forming system represented by photographic technology and computer graphics, there has been a growing demand for hard copies of color images.

The image formation according to the above-mentioned methods is performed by using a sheet provided with a receptor layer designed to carry a sublimation dye, a heat fusible ink, an ink, or the like. Usually, this image-receiving sheet is a white sheet or a transparent sheet. On some occasions, after image formation, the image-receiving sheet is provided with a hologram by transfer, lamination or the like for such purpose as prevention of counterfeiting, prevention of alteration, or for addition of a special effect to the image.

However, the formation of the hologram on the receptor layer after image formation thereon has been associated with the following problems. That is, it is necessary to use a special printer which is provided with both an image forming step and a hologram forming step. Alternatively, it is necessary to use a special device for the hologram formation separately from a printer for the image formation. Because of this, the image formation becomes less easy and an increase in cost is unavoidable. Further, the hologram formation by, for example, use of a thin film of metallic vapor deposition must be avoided because the film hides the image already formed in the receptor layer, and therefore a significant restriction has been imposed on the hologram formation.

Meanwhile, the use of an ordinary printing method makes it possible to print an image on a sheet on which a hologram or a thin film of metallic vapor deposition is provided in advance. This case, however, presents a problem that it is difficult to individually deal with private or specific information unlike the case of the aforementioned thermal transfer method or inkjet method.

SUMMARY OF THE INVENTION

The object of the present invention is to provide an image-receiving sheet which can produce a high-quality image based on private or specific information and which provides optical information by reflected light.

The image-receiving sheet of the present invention comprises a substrate sheet, a reflection layer disposed on at least one surface side of the substrate sheet so as to be laid on at least one area thereof, and a receptor layer disposed on at least one surface side of the substrate, wherein said reflection layer has at least one area provided with a convexo-concave pattern, the area provided with the convexo-concave pattern of the reflection layer being extended within an area provided with the receptor layer.

Since the image-receiving sheet of the present invention makes it possible to form an image in the receptor layer by a thermal transfer method, an ink-jet method, or the like, it is possible to form a high-quality image based on private information. According to the image-receiving sheet of the present invention, the light reflected by the convexo-concave pattern of the reflection layer can be recognized through the receptor layer. Because of this, a special effect can be imparted to the image formed in the receptor layer. Since these effects can be obtained by use of an image forming printer which is based on a thermal transfer method, an ink-jet method, or the like and which is not provided with the hologram forming step, the image formation is easy and cost does not increase. Further, the image is not hidden even if a light-screening film, such as a thin film of metallic vapor deposition, is used in the refection layer, and therefore no restriction is imposed on the hologram.

According to an embodiment of the present invention, the reflection layer and the receptor layer are disposed on the same surface side of the substrate sheet, and the reflection layer is interposed between the substrate sheet and the receptor layer.

According to this embodiment, since the substrate sheet is not interposed between receptor layer and the reflection layer, a material which is not transparent can be used as the substrate sheet, and therefore the latitude for selection of the substrate sheet can be widened.

Alternatively, the reflection layer and the receptor layer may be disposed on opposite surface sides of the substrate sheet respectively, provided, however, that the substrate sheet is composed of a transparent material.

According to an embodiment of the present invention, the convexo-concave pattern comprises an interference fringe of a hologram.

According to this embodiment, since the convexo-concave pattern comprises an interference fringe of a hologram and therefore the optical information by reflected light can be superposed on the image information of the receptor layer, a visual effect, a counterfeit preventing effect, and an alteration preventing effect can be obtained.

The convexo-concave pattern may be divided into plural areas. In this case, the convexo-concave patterns in plural areas may be composed of a single kind, or they may be composed of plural kinds.

According to an embodiment of the image-receiving sheet of the present invention, the receptor layer is disposed on only one surface side of the substrate sheet, and an adhesive layer and a release sheet are disposed in this order on the other surface side of the substrate sheet.

According to this embodiment, since the adhesive layer and a release sheet are disposed on one surface side of the substrate sheet to thereby produce a labeling form, private information provided with a special image effect can be easily affixed to various members.

DESCRIPTION OF THE PREFERRED EMBODIMENTS

Figure 1:
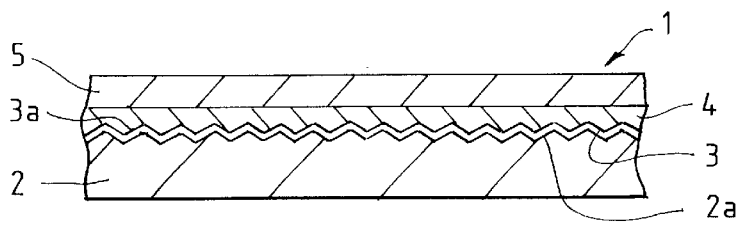
FIG. 1 is a sectional view illustrating a first embodiment of the image-receiving sheet of the present invention.

The embodiments of the present invention will be explained below by referring to the drawings.

The First Embodiment

FIG. 1 is a schematic sectional view illustrating the image-receiving sheet of one embodiment of the present invention. As shown in FIG. 1, an image-receiving sheet 1 comprises a substrate sheet 2, a reflection layer 3 disposed on one surface side of the substrate sheet 2, and a receptor layer 5 which covers the reflection layer 3 via a primer layer 4 interposed therebetween, wherein the reflection layer 3 is provided with a convexo-concave pattern 3a.

The material for the substrate sheet 2 is not particularly limited, and any material for a conventional image-receiving sheet can be used for the substrate sheet 2. In addition, since the reflection layer 3 and the receptor layer 5 are disposed only on the same surface side of the substrate 2, the substrate layer 2 may be transparent or opaque. Examples of the substrate sheet 2 include synthetic papers such as a polyolefin paper and a polystyrene paper; papers such as a fine-quality paper, an art paper, a coated paper, a cast-coated paper, a wall paper, a back-lining paper, a synthetic resin-impregnated paper, an emulsion-impregnated paper, a rubber latex-impregnated paper, a synthetic resin-blended paper and a cardboard; cellulosic papers; plastic films such as a polyolefin film, a polyvinyl chloride film, a polyethylene terephthalate film, a polystyrene film, a polymethacrylate film, and a polycarbonate film; and laminated products of these materials. Preferred examples of the substrate sheet 2 include a lightweight coated paper having a basis weight of 60 to 80 g/m², and a biaxially oriented polyethylene terephthalate resin film having a thickness of 50 to 70 μm. More preferably, the substrate sheet 2 is a film made by a process comprising blending a polyethylene terephthalate resin with white particles such as titanium oxide, barium sulfate, or the like and then biaxially stretching the resulting product.

According to this embodiment, a convexo-concave pattern 2a is disposed on the surface of the substrate 2 where the reflection layer is disposed. Since a reflection layer 3 described later is disposed on the convexo-concave pattern 2a, the reflection layer 3 is provided with a convexo-concave pattern 3a. The convexo-concave pattern 2a may be an interference fringe of a hologram or a diffraction grating.

The hologram may be a plane hologram or a volume hologram. In the case of a plane hologram, a relief hologram is preferred from the standpoint of mass production, durability, and cost. In the case of a volume hologram, a Lippmann hologram is preferred from the standpoint of image reproduction and mass production. Other types of hologram include a laser-reproduction hologram such as a Fresnel hologram, a Fraunhofer hologram, a lensless Fourier transform hologram, or an image hologram; and a white light reproduction hologram such as a rainbow hologram. Also usable are the holograms utilize the principles of the above-mentioned holograms and there are exemplified as those by a color hologram, a computer hologram, a hologram display, a multiplex hologram, and a holographic stereogram.

A holographic diffraction grating, a mechanically formed diffraction grating by means of, for example, an electron beam lithography system, or the like can be used as the diffraction grating.

The convexo-concave pattern 2a can be formed on the substrate sheet 2 by, for example, a method wherein a press template having a desired convexo-concave pattern formed therein is pressed under heat against the substrate 2, or a method wherein the surface of the substrate sheet 2 is physically ablated by means of an electron beam lithography system.

The reflection layer 3 is designed to reflect light in a visual region (having a wavelength in the range of 380 to 700 nm) and is made of a metal having a metallic gloss. Specific examples of the metal include Zn, Al, In, Ag, Cd, Au, Ge, Sn, Se, Cu, Pb, Bi, Mg, and the like.

The reflection layer 3 may have a single-layer structure or a multilayer structure. The reflection layer 3 can be formed on the substrate 2 by a known method such as vapor deposition, sputtering, plating, or ion plating. The thickness of the reflection layer 3 is about 10 to 10000 Å, and preferably about 100 to 5000 Å. As described previously, since the reflection layer 3 is formed on the convexo-concave pattern 2a which is formed on the substrate sheet 2 in advance, the reflection layer 3 is provided with the convexo-concave pattern 3a corresponding to the convexo-concave pattern 2a.

The primer layer 4 is designed to increase the adhesion between the reflection layer 3 and the receptor layer 5. The primer layer 4 can be made of a resin such as a polyurethane resin, an acrylic resin, a polyethylene resin, a polypropylene resin, or an epoxy resin, and the thickness of the primer layer 4 is preferably about 0.1 to 25 μm. It is necessary for the primer layer 4 to have a light transmissivity which allows the reproduction of the hologram. The formation of the primer layer is not necessary in the case where the adhesion between the reflection layer 3 and the receptor layer 5 is good and in the case where the adhesion between the substrate sheets 22, 32 and the receptor layers 25 and 35 is good.

The receptor layer 5 is designed to carry a sublimation dye, a heat fusible ink, an ink, or the like in the image formation based on such method as a sublimation type thermal transfer method, a heat fusion type transfer method, or an ink-jet method. It is necessary for the receptor layer 5 to have a light transmissivity allowing the reproduction of the hologram.

In the case of the image formation according to a sublimation type thermal transfer method, the receptor layer 5 functions as a dye receptor layer which receives the sublimation dye migrating from a thermal transfer sheet and carries the image formed. The receptor layer 5 can be made of, for example, a polyolefin resin such as polypropylene; a vinyl resin such as polyvinyl chloride, polyvinylidene chloride, polyvinyl acetate, or polyacrylate; a polyester resin such as polyethylene terephthalate or polybutylene terephthalate; a polystyrene resin; a polyamide resin; a copolymer of an olefin such as ethylene or propylene with other vinyl monomer; an ionomer; a cellulosic resin such as cellulose diacetate; or a polycarbonate resin. Most preferably, the receptor layer 5 can be made of a vinyl resin or a polyester resin. The receptor layer 5 can be prepared by a process comprising the steps of preparing an ink by dissolving or dispersing the above-mentioned resin and a necessary additive in an appropriate solvent, coating the ink thus prepared on the primer layer 4 by a known means, and then drying the coating. The thickness of the receptor layer 5 is preferably about 1 to 20 μm.

In the case of the image formation according to a heat fusion type transfer method, the receptor layer 5 functions as a layer which receives the heat fusible ink transferred from a thermal transfer sheet and carries the image formed. The receptor layer 5 can be made of, for example, a vinyl chloride/vinyl acetate copolymer, an acrylonitrile copolymer, polyester, polyvinyl alcohol, polyurethane, a styrene/butadiene rubber, an acrylic resin, a styrene/acrylic resin, a modified product of a natural resin, or a petroleum resin. The thickness of the receptor layer 5 can be, for example, in the range of 1 to 20 μm.

The receptor layer 5 suitable for the image formation based on the above-described sublimation type thermal transfer method or heat fusion type transfer method, may contain a release agent in an amount within the range of 1 to 30% by weight in order to prevent the sticking between the thermal transfer sheet and the receptor layer 5 or in order to prevent the reduction in the transfer sensitivity. Examples of the release agent include a silicone oil, a surfactant based on a phosphoric ester, and a surfactant based on a fluorine-containing compound. A silicone oil is preferable as the release agent. The silicone oil is preferably a modified silicone oil such as an epoxy-modified silicone oil, a vinyl-modified silicone oil, an alkyl-modified silicone oil, an amino-modified silicone oil, a carboxyl-modified silicone oil, an alcohol-modified silicone oil, a fluorine-modified silicone oil, an alkylaralkylpolyether-modified silicone oil, an epoxy/polyether-modified silicone oil, or a polyether-modified silicone oil. Alternatively, it is also possible to dispose a layer comprising the above-mentioned release agent on the receptor layer 5.

In the case of the image formation according to an ink jet method, the receptor layer 5 functions as a layer which absorbs the water component of the adherent ink so as to solidify the ink by drying and carries the image formed. The receptor layer 5 can be a receptor layer hitherto known for use in an ink jet method. For example, the receptor layer 5 may be a layer comprising a water-soluble polymer and a filler incorporated therein which absorbs the water component of the ink so that the drying of the ink is facilitated. Examples of the water-soluble polymer include vinyl polymers and derivatives thereof such as polyvinyl alcohol, polyvinyl pyrrolidone, a polyvinylpyridinium halide, and a cation-modified polyvinyl alcohol; acrylic group-containing polymers such as polyacrylamide, polydimethylacrylamide, polydimethyl aminoacrylate, sodium polyacrylate, and an acrylic acid/vinyl alcohol copolymer; naturally occurring polymers or derivatives thereof such as starch, oxidized starch, carboxylated starch, starchdialdehyde, cationized starch, dextrin, sodium alginate, gum arabic, casein, methyl cellulose, ethyl cellulose, carboxymethyl cellulose, hydroxyethyl cellulose, and hydroxybutyl cellulose; and synthetic polymers such as polyethylene glycol, polypropylene glycol, polyvinyl ether, a maleic acid/alkyl vinyl ether copolymer, a maleic acid/N-vinylpyrrole copolymer, and polyethyleneimine. Examples of the filler include silica and porous beads. The thickness of the receptor layer 5 is preferably about 3 to 50 μm.

The receptor layer 5 may contain an anti-static agent. Examples of the anti-static agent are known ones exemplified by cationic anti-static agents such as a quaternary ammonium salt and a polyamine derivative; anionic anti-static agents such as alkyl phosphates; and nonionic anti-static agents such as fatty acid esters.

The Second Embodiment

Figure 2:
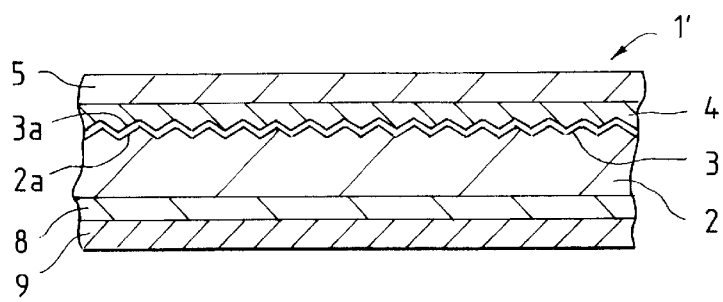
FIG. 2 is a sectional view illustrating a second embodiment of the image-receiving sheet of the present invention.

FIG. 2 is a schematic sectional view illustrating the image-receiving sheet of another embodiment of the present invention. As shown in FIG. 2, an image-receiving sheet 1' comprises a substrate sheet 2, a reflection layer 3, a primer layer 4, a receptor layer 5, an adhesive layer 8, and a release sheet 9. A reflection layer 3, a primer layer 4, and a receptor layer 5 are disposed in this order on one surface side of the substrate sheet 2. Meanwhile, an adhesive layer 8 and a release sheet 9 are disposed in this order on the other surface side of the substrate sheet 2.

Since the substrate sheet 2, the reflection layer 3, the primer layer 4, and the receptor layer 5, each constituting the image-receiving sheet 1', are the same as those in the aforedescribed image-receiving sheet 1, the explanation about them is omitted.

The adhesive layer 8 for the image-receiving sheet 1' may be made of a synthetic resin, a natural resin, a rubber, a wax, or the like. Specific examples of these materials include cellulosic derivatives such as ethyl cellulose and cellulose acetate propionate; styrenic resins such as polystyrene and poly α-methylstyrene; acrylic resins such as polymethyl methacrylate and polyethyl acrylate; vinyl resins such as polyvinyl chloride, polyvinyl acetate, a vinyl chloride/vinyl acetate copolymer, polyvinyl butyral, and polyvinyl acetal; another synthetic resins such as polyester resins, polyamide resins, epoxy resins, polyurethane resins, an ionomer, an ethylene/acrylic acid copolymer and an ethylene/acrylate copolymer; tackifiers such as rosin and a rosin-modified maleic acid resin; and natural resins and synthetic rubbers or derivatives thereof such as ester gum, a polyisobutylene rubber, a butyl rubber, a styrene/butadiene rubber, a butadiene/acrylonitrile rubber, a polyamide resin, and a polychlorinated olefin.

The adhesive layer 8 may comprise a composition composed of one or two, or more, of these materials. Although the thickness of the adhesive layer 8 may be selected by taking into account the required adhesive capacity and ease in handling, the thickness is preferably about 5 to 30 μm in a normal case.

The release sheet 9 for the image-receiving sheet 1' is obtained by treating the surface of a traditionally known plastic film or synthetic paper with a traditionally known release agent such as a silicone for the purpose of improving releasability of the surface. The plastic films may be those previously enumerated for the substrate sheet 2. Among these plastic films, particularly preferred is a polyolefin resin film whose surface is not treated. Examples of the synthetic paper include a film obtained by extruding and stretching a blend of a polyolefin resin with a filler, and a film obtained by coating a resin film, such as a polyolefin film, a polystyrene film, or a polyester film, with a blend comprising a filler and a binder. The thickness of the release sheet 9 may be set to an appropriate value within the range of 20 to 100 μm.

The peel strength between the adhesive layer 8 and the release sheet 9 as measured according to JIS P8139 may be set to an appropriate value within the range of 40 to 900 g, and preferably within the range of 100 to 700

The Third Embodiment

Figure 3:
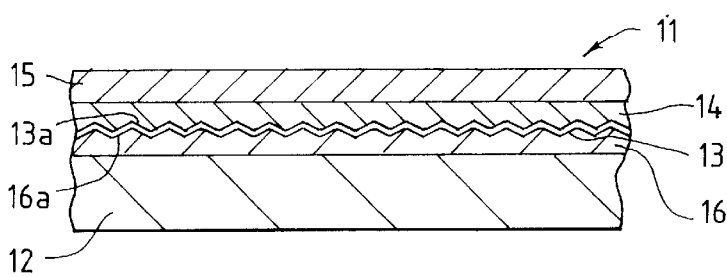
FIG. 3 is a sectional view illustrating a third embodiment of the image-receiving sheet of the present invention.

FIG. 3 is a schematic sectional view illustrating the image-receiving sheet of another embodiment of the present invention. As shown in FIG. 3, an image-receiving sheet 11 comprises a substrate sheet 12 as well as a hologram layer 16, a reflection layer 13, a primer layer 14 and a receptor layer 15 disposed in this order on one surface side of the substrate sheet 12. The image-receiving sheet 11 differs from the aforedescribed image-receiving sheet 1 in that the image-receiving sheet 11 comprises the hologram layer 16 interposed between the substrate sheet 12 and the reflection layer 13 and in that the substrate sheet 12 is not provided with a convexo-concave pattern. Since the substrate sheet 12, the primer layer 14, and the receptor layer 15, each constituting the image-receiving sheet 11, can be the same as the substrate sheet 2, the primer layer 4, and the receptor layer 5, each constituting the aforedescribed image-receiving sheet 1, the explanation about them is omitted.

The hologram layer 16 is provided with a convexo-concave pattern 16a (interference fringe) and may be a plane hologram or a volume hologram. In the case of a plane hologram, a relief hologram is preferable from the standpoint of mass production, durability and cost. On the other hand, in the case of a volume hologram, a Lippmann hologram is preferable from the standpoint of image reproduction and mass production.

Further, a laser-reproduction hologram such as a Fresnel hologram, a Fraunhofer hologram, a lensless Fourier transform hologram, or an image hologram as well as a white light reproduction hologram such as a rainbow hologram, can also be used. Furthermore, as holograms utilizing these principles, a color hologram, a computer hologram, a hologram display, a multiplex hologram, a holographic stereogram, a holographic diffraction grating, and the like can also be used.

Examples of the material which forms the hologram layer 16 include thermoplastic resins such as polyvinyl chloride, an acrylic resin, e.g., polymethyl methacrylate, polystyrene, and polycarbonate; thermosetting resins such as unsaturated polyester, melamine, epoxy, polyester(meth)acrylate, urethane(meth)acrylate, epoxy(meth)acrylate, polyether (meth)acrylate, polyol(meth)acrylate, melamine(meth) acrylate, and triazine-based acrylate; and mixtures of these thermoplastic resins and thermosetting resins. In addition, a thermally formable material, which has an unsaturated group capable of a radical polymerization, can also be used as a material for the hologram 16.

The hologram layer 16 can be formed by a conventionally known method. For example, in the case where the hologram layer 16 is a relief hologram, a hologram original plate, which has an interference fringe recorded as a convexo-concave pattern, is used as a press template. That is, the process comprises the steps of superposing a hologram-forming resin sheet composed of the aforedescribed material on the hologram original plate, pressing the sheet against the original plate under heat by means of, for example, heating rolls so that a convexo-concave pattern of the hologram original plate is duplicated on the surface of the hologram-forming resin sheet to thereby prepare a resin sheet having a surface relieved with a pattern. The hologram layer 16 can be obtained by laminating the resin sheet thus prepared onto the substrate sheet 12.

In the case where the hologram layer 16 is a volume hologram, the hologram layer 16 can be duplicated by a process comprises the steps of coating a photosensitive polymer on the substrate sheet 12, stacking face to face the coated substrate sheet 12 and a hologram original plate prepared in advance, and irradiating the stack with laser light in the shape of a slit. A developing treatment or the like may be further performed.

Naturally, a layer provided with, for example, an interference fringe of diffraction grating as a convexo-concave pattern may be disposed in place of the hologram layer 16.

The reflection layer 13 is designed to reflect the light in a visual region (having a wavelength in the range of 380 to 700 nm) and is made of a metal having a metallic gloss as in the case of the reflection layer 3 constituting the aforedescribed image-receiving sheet 1. Further, the reflection layer 13 may be a transparent thin film having an index of refraction different from that of the hologram 16 or may be a reflective thin film of a metal having a thickness of 200 Å or less.

In the case where the reflection layer 13 is a transparent thin film, the index of refraction may be greater or smaller than that of the hologram 16. However, it is desirable that the difference in the index of refraction be 0.1 or more, and preferably 0.5 or more, and the value of the index of refraction be 1.0 or more. Specifically, the following compounds can be used.

$TiO_2$ (having an index of refraction of 2.3)
ZnS (having an index of refraction of 2.3)
PbO (having an index of refraction of 2.6)
$Bi_2O_3$ (having an index of refraction of 2.4)
$PbCl_2$ (having an index of refraction of 2.3)
SiO (having an index of refraction of 2.0)
LiF (having an index of refraction of 1.4)
$MgF_2$ (having an index of refraction of 4.4)
$AlF_3$ (having an index of refraction of 1.4)
NaF (having an index of refraction of 1.3)
Polytetrafluoroethylene (having an index of refraction of 1.35)
Polypropylene (having an index of refraction of 1.49)
Polyvinylidene chloride (having an index of refraction of 1.60 to 1.63)

The thickness of the transparent thin film is not particularly limited in so far as the thickness is within a range securing the transparency. Although a thickness can be appropriately selected depending on the material to be used, the thickness is usually about 10 to 10000 Å, and preferably about 100 to 5000 Å.

In the case of a reflective thin film of metal having a thickness of 200 Å or less, despite the fact that the film is made of a reflective metal, the film as thin as 200 Å or less has a high transmissivity to light waves so that the film exhibits a diffraction or hologram effect but does not hide the display portion. That is, when light waves pass through the thin film of a reflective metal, since the amplitude abruptly decreases according to $\exp(-2\pi K)$ per wavelength, the transmissivity considerably decreases if the thickness exceeds 200 Å. Accordingly, a film thickness of 200 Å or less secures a sufficient transmissivity of the film, while the film exhibits a diffraction or hologram effect. In addition, a problem associated with a conventional technology, i.e., disagreeable silver gray appearance having a high brightness, can be eliminated by use of the film having a thickness of 200 Å or less.

Such a thin film of a reflective metal has a complex index of refraction, and the complex index of refraction n is expressed as $n^* = n - iK$ where n denotes an index of refraction and K denotes a coefficient of absorption. Specific examples of the material for the thin film of a reflective metal include the following materials.

Be(n=2.7; K=0.9),
Ce(n=1.7; K=1.4),
Cr(n=3.3; K=1.3),
Ag(n=0.1; K=3.3),
Al(n=0.8; K=5.3),
Ni(n=1.8; K=1.8)

Besides these materials, also usable are other metals such as Sn, In, Te, Ti, Fe, Co, Zn, Ge, Pb, Cd, Bi, Se, Ga, Rb, and the like. Further, oxides, nitrides, and the like of these metals are also usable. Furthermore, the metals, oxides of the metals, and nitrides of the metals may be used singly or in a combination of two or more of them.

Also in the image-receiving sheet 11 of this embodiment, the adhesive layer and the release sheet may be disposed face to face on the substrate sheet 12 on the surface side thereof opposite to the surface side where the receptor layer 15 is disposed, as in the case of the aforedescribed image-receiving sheet 1'.

The Fourth Embodiment

Figure 4:
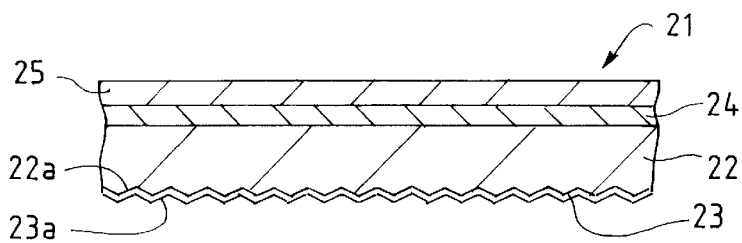
FIG. 4 is a sectional view illustrating a fourth embodiment of the image-receiving sheet of the present invention.

FIG. 4 is a schematic sectional view illustrating the image-receiving sheet of another embodiment of the present invention. As shown in FIG. 4, an image-receiving sheet 21 comprises a substrate sheet 22 as well as a reflection layer 23, a primer layer 24 and a receptor layer 25. The primer layer 24 and the receptor layer 25 are disposed in this order on one surface side of the substrate sheet 22, while the reflection layer 23 is disposed on the other surface side of the substrate sheet 22. The image-receiving sheet 21 differs from the aforedescribed image-receiving sheet 1 in that the image-receiving sheet 21 comprises the reflection layer 23 on the substrate sheet 22 on the surface side thereof opposite to the surface side where the receptor layer 25 is disposed.

That is, the reflection layer 23 and the receptor layer 25 are disposed on opposite surface sides of the substrate sheet 22 respectively in the image-receiving sheet 21. Because of this, in order that the optical information formed by the reflection layer 23 can be recognized from the side of the receptor layer 25, the substrate sheet 22 needs to be made of a transparent material. The material for the substrate sheet 22 can be selected from the transparent materials exemplified as the materials for the substrate sheet 2 of the image-receiving sheet 1.

According to the image-receiving sheet 21, a convexo-concave pattern 22a is formed in advance on the substrate sheet 22 on the surface side thereof where a reflection layer will be formed. Then, a reflection layer 23 is formed on the convexo-concave pattern 22a. In this way, a convexo-concave pattern 23a is formed on the reflection layer 23. Since the formation of the convexo-concave pattern 22a on the substrate sheet 22 can be carried out by the same process as in the formation of the convexo-concave pattern 2a on the substrate sheet 2, the explanation of the process is omitted.

A foamed resin film may be interposed between the substrate sheet 22 and the primer layer 24. A conventionally known foamed resin film, such as a foamed polypropylene film or a foamed polyethylene terephthalate film, can be used as the foamed resin film. The thickness of the foamed resin film is preferably about 30 to 60 $\mu$m. The use of such a foamed resin film makes it possible to increase the color forming density, and particularly the density of the high-density portion, of the image to be formed in the receptor layer 25 and, as a result, enhances the image quality.

Since the reflection layer 23, the primer layer 24, and the receptor layer 25, each constituting the image-receiving sheet 21, can be the same as the reflection layer 3, the primer layer 4, and the receptor layer 5, each constituting the aforedescribed image-receiving sheet 1, the explanation about them is omitted.

Figure 5:
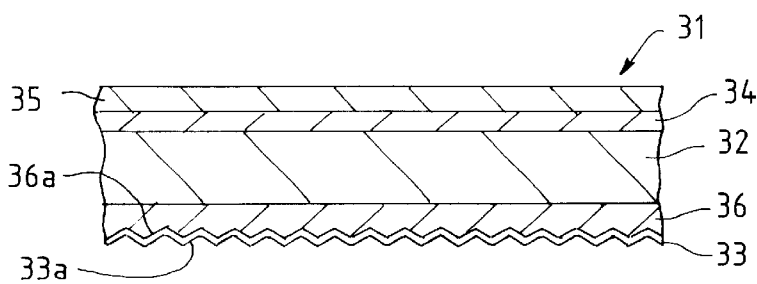
FIG. 5 is a sectional view illustrating a fifth embodiment of the image-receiving sheet of the present invention.

Also in the image-receiving sheet 21 of this embodiment, the adhesive layer and the release sheet may be disposed face to face on the reflection layer 23, as in the case of the aforedescribed image-receiving sheet The Fifth Embodiment FIG. 5 is a schematic sectional view illustrating the image-receiving sheet of yet another embodiment of the present invention. As shown in FIG. 5, an image-receiving sheet 31 comprises a substrate sheet 32 as well as a reflection layer 33, a primer layer 34, a receptor layer 35, and a hologram layer 36. The primer layer 34 and the receptor layer 35 are disposed in this order on one surface side of the substrate sheet 32, while the hologram layer 36 and the reflection layer 33 are disposed in this order on the other surface side of the substrate sheet 32. The image-receiving sheet 31 differs from the aforedescribed image-receiving sheet 11 in that the image-receiving sheet 31 comprises the reflection layer 33 and the hologram layer 36 on the substrate sheet 32 on the surface side thereof opposite to the surface side where the receptor layer 35 is disposed.

That is, the reflection layer 33 and the receptor layer 35 are disposed on opposite surface sides of the substrate sheet 32 respectively in the image-receiving sheet 31. Because of this, in order that the optical information formed by the reflection layer 33 can be recognized from the side of the receptor layer 35, the substrate sheet 32 needs to be made of a transparent material. The material for the substrate sheet 32 can be selected from the transparent materials exemplified as the materials for the substrate sheet 2 of the image-receiving sheet 1.

Besides, in order to increase the color forming density, and particularly the density of the high-density portion, of the image to be formed in the receptor layer 35 so that the image quality is enhanced, a foamed resin film may be interposed between the substrate sheet 32 and the primer layer 34. A conventionally known foamed resin film, such as a foamed polypropylene film or a foamed polyethylene terephthalate film, can be used as the foamed resin film. The thickness of the foamed resin film is preferably about 30 to 60 $\mu$m.

The hologram layer 36, which constitutes the image-receiving sheet 31, is provided with a convexo-concave pattern 36a. Since the formation of the hologram layer 26 can be carried out by the same process as in the formation of the hologram layer 16 constituting the image-receiving sheet 11, the explanation of the process is omitted.

The reflection layer 33 disposed on the hologram layer 36 is provided with a convexo-concave pattern 33a corresponding to the convexo-concave pattern 36a of the hologram layer 36. The reflection layer 33 having this structure can be formed in the same way as in the formation of the reflection layer 6 constituting the image-receiving sheet 1.

Further, the primer layer 34 and the receptor layer 35 can be formed in the same way as in the formation of the primer layer 4 and the receptor layer 5 which constitute the aforedescribed image-receiving sheet 1.

Also in the image-receiving sheet 31 of this embodiment, the adhesive layer and the release sheet may be disposed face to face on the reflection layer 33, as in the case of the aforedescribed image-receiving sheet 1.

The foregoing embodiments are for the purpose of illustration, and the present invention is not limited by these embodiments. For example, in these embodiments, the areas having convexo-concave patterns 3a, 13a, 23a, and 33a of the respective reflection layers 3, 13, 23, and 33 coincide, respectively, with the areas where the receptor layers 5, 15, 25, and 35 are formed. However, the reflection layer may be formed partly on the substrate sheet, or alternatively the convexo-concave pattern may be formed partly on the reflection layer. Including the aforedescribed embodiments, according to the image-receiving sheet of the present invention, the area provided with the convexo-concave pattern of the reflection layer extends within the area provided with the receptor layer. Further, according to the present invention, if the reflection layer and the receptor layer are disposed on the same surface side of the substrate, the reflection layer is interposed between the substrate sheet and the receptor layer.

Figure 6:
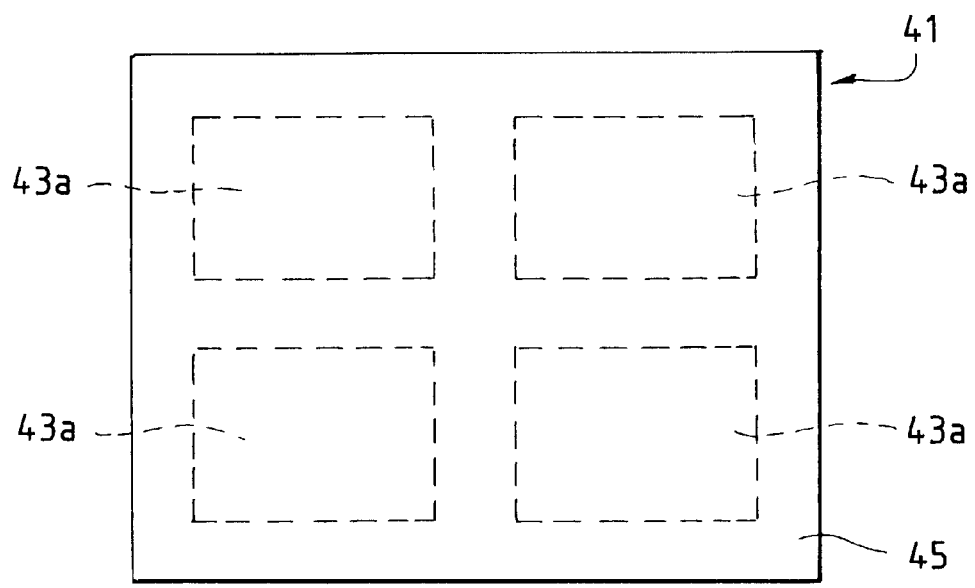
FIG. 6 is a top view illustrating an image-receiving sheet whose reflection layer is provided with a convexo-concave pattern divided into plural areas.

FIG. 6 is a top view which is seen from the receptor layer side and illustrates an image-receiving sheet of the present invention whose reflection layer is provided with a convexo-concave pattern divided into plural areas. In FIG. 6, an image-receiving sheet 41 is provided with a receptor layer 45 in the entire area of the substrate sheet. The reflection layer formed either between the receptor layer 45 and the substrate sheet or on the other surface side of the substrate sheet, is provided with a convexo-concave pattern 43a divided into four areas (shown by broken lines). Since the area of the convexo-concave pattern 43a extends within the area of the receptor layer 45, the convexo-concave pattern 43a of the reflection layer can be recognized through the receptor layer 45 and a special image effect can be imparted to the image formed in the receptor layer 45. Further, if the convexo-concave pattern comprises an interference fringe of a hologram, the optical information by reflected light can be superposed on the image information of the receptor layer 45, and thus a visual effect, a counterfeit preventing effect, and an alteration preventing effect can be obtained.

Figure 7:
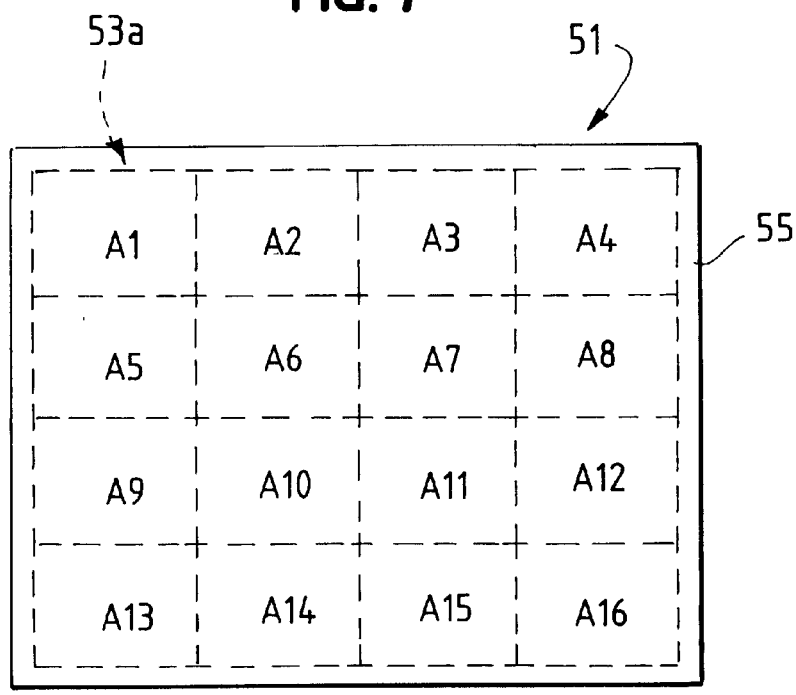
FIG. 7 is a top view illustrating an image-receiving sheet whose reflection layer is provided with a convexo-concave pattern divided into areas, wherein the convexo-concave patterns in these areas are composed of plural kinds.

Besides, according to the present invention, the reflection layer may be provided with a convexo-concave pattern divided into plural areas, and the convexo-concave patterns in these areas may be composed of plural kinds. FIG. 7 is a top view which is seen from the receptor layer side of an image-receiving sheet of the present invention whose reflection layer is provided with a convexo-concave pattern divided into plural areas. In FIG. 7, an image-receiving sheet 51 is provided with a receptor layer 55 in the entire area of the substrate sheet. The reflection layer, which is formed either between the receptor layer 55 and the substrate sheet or on the other surface side of the substrate sheet, is provided with a convexo-concave pattern 53a divided into 16 areas (shown by broken lines), wherein the convexo-concave patterns in these areas are composed of 16 kinds (A1~A16). Since the area of he convexo-concave pattern 53a also extends within the area of the receptor layer 55, the convexo-concave pattern 53a of the reflection layer can be recognized through the receptor layer 55.

Further, according to the present invention, if an image-receiving sheet comprises the adhesive layer 8 and the release sheet 9 as in the aforedescribed image-receiving sheet 1', a slit (half cut) in any shape may be formed in the multilayered structure of the image-receiving sheet excluding the release sheet 9. This slit, which is discontinuous in particular, prevents the area enclosed by the slit from being peeled off when, for example, an image is formed in the receptor layer. In addition, after the formation of the image, the area where the image is formed can be peeled off and is then affixed to other article.

Although a reflection layer is formed on one of the surface sides of substrate sheet in the above-mentioned embodiments, the reflection layer may be formed on both surface sides of the substrate sheet. However, if the reflection layer is formed on both surface sides of the substrate sheet, it is desirable that the areas where the reflection layer is formed do not overlap with each other.

EXAMPLES

The present invention is explained in further detail by way of the following specific examples.

A 50 μm thick polyethylene terephthalate sheet ("Lumirror T-60" manufactured by Toray Industries, Inc. Co., Ltd.) was used as a substrate sheet. A coating liquid having the following composition was applied to one surface side of the substrate sheet and thus a resin layer (having a thickness of 3 μm) for the formation of a hologram layer was produced.

(Coating Liquid for Formation of Hologram Layer)

| Acrylic resin: | 40 parts by weight |
|---|---|
| Melamine resin: | 10 parts by weight |
| Cyclohexanone: | 50 parts by weight |
| Methyl ethyl ketone: | 50 parts by weight |

Next, a hologram original plate of a rainbow hologram was superposed on the resin layer, and the original plate was pressed under heat against the resin layer (150° C., 50 kg/cm$^2$, 1 minute). After that, the hologram original plate was peeled from the resin layer. In this way, a hologram relief was formed on the resin layer, and this layer was used as a hologram layer.

Then, a 400 Å thick aluminum layer was vapor-deposited on the hologram layer by resistance heating. The aluminum layer thus obtained was used as a reflection layer.

Next, a coating liquid for primer layer having the following composition was applied (at a coating weight based on solids of 0.6 g/m$^2$) to the reflection layer. The coating was dried, and thus a primer layer was formed. Further, a coating liquid for a receptor layer (dye receptor layer) having the following composition was applied (at a coating weight based on solids of 4 g/m$^2$) to the primer layer. The coating was dried, and thus a receptor layer was formed. In this way, an image-receiving sheet of the present invention having a structure as shown in FIG. 3 was prepared.

(Coating Liquid for Formation of Primer Layer)

| THF Primer (manufactured by The Inktech Co., Ltd.): | 100 parts by weight |
|---|---|
| XEL Hardener (D) (manufactured by The Inktech Co., Ltd.): | 5 parts by weight |
| Toluene: | 100 parts by weight |
| Methyl ethyl ketone: | 100 parts by weight |

(Coating Liquid for Formation of Receptor Layer (Dye Receptor Layer))

| Vinyl chloride/vinyl acetate copolymer (Denkalac #1000A manufactured by Denki Kagaku Kogyo Co., Ltd.): | 40 parts by weight |
|---|---|
| Polyester resin (Vylon 600 manufactured by Toyobo Co., Ltd.): | 40 parts by weight |
| Vinyl chloride/styrene/acrylic copolymer (Denkalac #400A manufactured by Denki Kagaku Kogyo Co., Ltd.): | 20 parts by weight |
| Vinyl-modified silicone (X-62-1212 manufactured by Shin-Etsu Chemical Co., Ltd.): | 10 parts by weight |
| Catalyst (CAT-PLR-5 manufactured by Shin-Etsu Chemical Co., Ltd.): | 5 parts by weight |
| Catalyst (CAT-PL-50T manufactured by Shin-Etsu Chemical Co., Ltd.): | 6 parts by weight |

To the other surface side of the image-receiving sheet prepared in the above-described way was applied an adhesive agent having the following composition (at a coating weight based on solids of 15 g/m$^2$) and the coating was dried (70° C. for 1 minute) to thereby prepare an adhesive layer. A biaxially oriented polypropylene film (Pylen P2156 having a thickness of 50 μm manufactured by Toyobo Co., Ltd.) whose surface was not treated was laminated face to face to the adhesive layer. In this way, an image-receiving sheet of the present invention was prepared.

(Coating Liquid for Formation of Adhesive Layer)

| | |
|---|---|
| SK Dyne 1310L (manufactured by Soken Chemical Co. Ltd.): | 16 parts by weight |
| Hardener E-AX (manufactured by Soken Chemical Co. Ltd.): | 0.12 parts by weight |
| Ethyl acetate: | 12.8 parts by weight |
| Toluene: | 3.2 parts by weight |

Next, the image-receiving sheet thus obtained was put together with a sublimation type thermal transfer sheet (manufactured by Dai Nippon Printing Co., Ltd.) having 3 dye layers, i.e., a yellow dye layer, a cyan dye layer, and a magenta dye layer, disposed side by side on the surface thereof, so that the receptor layer faced the dye layers. The image formation was performed by using a thermal head applied to the backside of the sublimation type thermal transfer sheet. The condition was as follows: applied voltage to the head: 12 V; pulse width: 16 m.second; printing cycle: 33.3 m.second; dot density: 6 dots/line. In this way, a full-color photograph of a person's face was formed in the receptor layer of the image-receiving sheet.

Through the receptor layer had the full-color photograph of a person's face formed in the above-described way, a convexo-concave pattern (rainbow hologram) of the reflection layer was recognized. As a result, it was confirmed that a special image effect could be imparted to the full-color photograph of a person's face formed in the receptor layer.

What is claimed is:

1. An image receiving sheet comprising:
   a substrate sheet;
   a receptor layer disposed on only one surface side of the substrate sheet;
   a reflection layer disposed on the other surface side of the substrate sheet so as to be laid on at least one area of the substrate sheet;
   an adhesive layer disposed on the other surface side of the substrate sheet so as to be on a back side of the reflection layer; and
   a release sheet disposed on the other surface side of the substrate sheet so as to be on a back side of the adhesive layer;
   wherein said reflection layer has at least one area provided with a convexo-concave pattern divided into plural areas, the area provided with the convexo-concave pattern of the reflection layer being extended with an area provided with the receptor layer, and
   wherein a peel strength between the adhesive layer and the release sheet as measured according to JIS-P8139 is within the range of 40 to 900 g.

2. An image receiving sheet according to claim 1 wherein said reflected layer and said receptor layer are disposed on opposite surface sides of the substrate sheet respectively, the substrate being composed of a transparent material.

3. An image receiving sheet according to claim 2, wherein said convexo-concave pattern comprises an interference fringe of a hologram.

4. An image receiving sheet according to claim 3, wherein said convexo-concave pattern divided into plural areas is composed of a single kind of convexo-concave pattern.

5. An image receiving sheet according to claim 3, wherein said convexo-concave pattern divided into plural areas is composed of plural kinds of convexo-concave pattern.

6. An image receiving sheet according to claim 2, wherein said convexo-concave pattern divided into plural areas is composed of a single kind of convexo-concave pattern.

7. An image receiving sheet according to claim 2, wherein said convexo-concave pattern divided into plural areas is composed of plural kinds of convexo-concave pattern.

8. An image receiving sheet according to claim 1 wherein said convexo-concave pattern comprises an interference fringe of a hologram.

9. An image receiving sheet according to claim 8, wherein said convexo-concave pattern divided into plural areas is composed of a single kind of convexo-concave pattern.

10. An image receiving sheet according to claim 8, wherein said convexo-concave pattern divided into plural areas is composed of plural kinds of convexo-concave pattern.

11. An image receiving sheet according to claim 1, wherein said convexo-concave pattern divided into plural areas is composed of a single kind of convexo-concave pattern.

12. An image receiving sheet according to claim 1, wherein said convexo-concave pattern divided into plural areas is composed of plural kinds of convexo-concave pattern.

13. An image receiving sheet according to claim 1, wherein a slit is formed in the multilayered structure of said image receiving sheet excluding the release sheet.

14. An image receiving sheet comprising:
    a substrate sheet;
    a receptor layer disposed on only one surface side of the substrate sheet;
    a reflection layer disposed between the receptor layer and the substrate sheet so as to be laid on at least one area of the substrate sheet;
    an adhesive layer disposed on the other surface side of the substrate sheet so as to be on a back side of the substrate sheet; and
    a release sheet disposed on the other surface side of the substrate sheet so as to be on a back side of the adhesive layer;
    wherein said reflection layer has at least one area provided with a convexo-concave pattern divided into plural areas, the area provided with the convexo-concave pattern of the reflection layer being extended with an area provided with the receptor layer, and
    wherein a peel strength between the adhesive layer and the release sheet is within the range of 40 to 900 g.

15. An image re eet according to claim 14, wherein said reflection layer and said receptor layer are disposed on the same surface side of the substrate sheet, the reflection layer being interposed between the substrate sheet and the receptor layer.

16. An image receiving sheet according to claim 15, wherein said convexo-concave pattern comprises an interference fringe of a hologram.

17. An image receiving sheet according to claim 16, wherein said convexo-concave pattern divided into plural areas is composed of a single kind of convexo-concave pattern.

18. An image receiving sheet according to claim 16, wherein said convexo-concave pattern divided into plural areas is composed of plural kinds of convexo-concave pattern.

19. An image receiving sheet according to claim 15, wherein said convexo-concave pattern divided into plural areas is composed of a single kind of convexo-concave pattern.

20. An image receiving sheet according to claim 15, wherein said convexo-concave pattern divided into plural areas is composed of plural kinds of convexo-concave pattern.

21. An image receiving sheet according to claim 14, wherein a slit is formed in the multilayered structure of said image receiving sheet excluding the release sheet.

* * * * *